(12) United States Patent
Julka et al.

(10) Patent No.: US 9,609,624 B2
(45) Date of Patent: Mar. 28, 2017

(54) PAGING MOBILE STATIONS IN A HYBRID NETWORK

(71) Applicant: TELEFONAKTIEBOLAGET L M ERICSSON (PUBL), Stockholm (SE)

(72) Inventors: Vibhor Julka, San Diego, CA (US); Erik Colban, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/868,960

(22) Filed: Sep. 29, 2015

(65) Prior Publication Data

US 2016/0021640 A1    Jan. 21, 2016

Related U.S. Application Data

(63) Continuation of application No. 11/057,643, filed on Feb. 14, 2005, now Pat. No. 9,198,156.

(Continued)

(51) Int. Cl.
*H04W 68/00* (2009.01)
*H04W 68/02* (2009.01)
(Continued)

(52) U.S. Cl.
CPC .......... *H04W 68/02* (2013.01); *H04W 68/00* (2013.01); *H04W 68/12* (2013.01); *H04W 88/08* (2013.01)

(58) Field of Classification Search
None
See application file for complete search history.

(56) References Cited

U.S. PATENT DOCUMENTS 5,978,699 A    11/1999    Fehse et al.
6,108,518 A     8/2000    Madour et al.
(Continued)

FOREIGN PATENT DOCUMENTS

CA    2689959 C    1/2013
EP    1052864 A1   11/2000
(Continued)

OTHER PUBLICATIONS

PCT International Search Report from corresponding application PCT/US2005/026603.
(Continued)

*Primary Examiner* — Diane Mizrahi
(74) *Attorney, Agent, or Firm* — Ericsson Inc.

(57) ABSTRACT

A paging procedure implemented by a base station avoids transmission of unnecessary page messages. In a first embodiment, a first base station is notified by a mobile switching center when a paging request is seat to a mobile station in a second base station. The first base station does not page the mobile station, but stores a paging parameter in memory. When the first base station receives a page response message from the mobile station, it correlates the unsolicited page response message with a paged mobile list to determine as corresponding paging parameter, and forwards the page response message with the stored paging parameter to the mobile switching center. In a second embodiment, the first base station pages the mobile station and then sends an immediate paging response to the mobile switching center without waiting for a page response from the mobile station to terminate the paging procedure at the mobile switching center.

13 Claims, 13 Drawing Sheets

Related U.S. Application Data

(60) Provisional application No. 60/603,694, filed on Aug. 23, 2004.

(51) Int. Cl.
*H04W 68/12* (2009.01)
*H04W 88/08* (2009.01)

(56) References Cited

U.S. PATENT DOCUMENTS

| | | |
|---|---|---|
| 6,480,717 B1 | 11/2002 | Ramaswamy |
| 6,961,329 B1 | 11/2005 | Bender et al. |
| 7,127,260 B1 | 10/2006 | Kim et al. |
| 7,193,991 B2 | 3/2007 | Melpignano et al. |
| 7,551,583 B1 | 6/2009 | Gazzard |
| 2002/0057658 A1 | 5/2002 | Lim |
| 2002/0068570 A1 | 6/2002 | Abrol et al. |
| 2002/0082029 A1 | 6/2002 | Ahmad et al. |
| 2002/0147010 A1 | 10/2002 | Cruz et al. |
| 2003/0104813 A1 | 6/2003 | Julka et al. |
| 2003/0109216 A1 | 6/2003 | Kim et al. |
| 2004/0058688 A1 | 3/2004 | Silver et al. |
| 2004/0120283 A1 | 6/2004 | Rezaiifar et al. |
| 2004/0185879 A1 | 9/2004 | Kong et al. |
| 2004/0257274 A1 | 12/2004 | Benco et al. |
| 2005/0276273 A1 | 12/2005 | Oprescu-Surcobe et al. |
| 2006/0040681 A1* | 2/2006 | Julka ............... H04W 68/00 455/458 |
| 2006/0154664 A1 | 7/2006 | Hidaka |
| 2011/0244887 A1* | 10/2011 | Dupray ............... G01C 21/206 455/456.2 |
| 2013/0288692 A1* | 10/2013 | Dupray ............... H04W 64/00 455/450 |

FOREIGN PATENT DOCUMENTS

| | | |
|---|---|---|
| EP | 1318684 A1 | 6/2003 |
| EP | 1424810 A1 | 6/2004 |
| JP | 11225165 | 8/1999 |
| JP | 2003289583 A | 10/2003 |
| JP | 2003530018 A | 10/2003 |
| JP | 2004193853 A | 7/2004 |
| SE | 303543 B | 9/1968 |
| WO | 0176165 A1 | 10/2001 |
| WO | 0180591 A2 | 10/2001 |
| WO | 0237866 A | 5/2002 |
| WO | 03090433 A1 | 10/2003 |
| WO | 2004057815 A2 | 7/2004 |
| WO | 2004059858 A1 | 7/2004 |
| WO | 2004059998 A1 | 7/2004 |
| WO | 2004060013 A1 | 7/2004 |
| WO | 2005125110 A2 | 12/2005 |

OTHER PUBLICATIONS

3GPP2: "Interoperability Specification (ISO) for High Rate Packet Data (HRPD) Access Network Interfaces,"3GPP2 A, S0008-0 V3.0, online May 2003, XP002352199; 128 pages.
3GPP2: "cdma2000 High Rate Packet Data Air Interface Specification,"3GPP2 C, S0024-A V1.0, Chapter 5, "3G1X Circuit Services Notification Application", online Mar. 31, 2004, pp. 5-1 to 5-38, XP002352200; 38 pages.

* cited by examiner

PAGING MOBILE STATIONS IN A HYBRID NETWORK

RELATED APPLICATIONS

This application is a continuation of co-pending U.S. Patent Application US 2006/0040681 filed on Feb. 14, 2005, which claims the benefit of U.S. Provisional Application No. 60/603,694, filed Aug. 23, 2004, the disclosures of which are incorporated herein by reference in their entireties.

This application claims priority to Provisional U.S. Patent Application 60/603,694 filed Aug. 23, 2004, which is incorporated herein by reference.

BACKGROUND OF THE INVENTION

The present invention generally relates generally to procedures for wireless communication networks, and more particularly, to a method of avoiding unnecessary transmission of paging messages over the air interface.

Cellular networks were originally developed to primarily provide voice services over circuit-switched networks. The introduction of packet-switched 2.5G and 3G networks enables network operators to now provide data services, as well as voice services. Eventually, network architecture is expected to evolve toward all-IP networks providing both voice and data services. However, network operators have a substantial investment in existing infrastructure and are expected to migrate gradually to an all-IP network architecture and to use their existing infrastructure whenever possible. At the same time, network operators recognize that there is a demand for high rate packet-data services.

In order to provide high-rate packet data services, network operators may deploy hybrid networks, where a high data rate (HDR) network is overlaid on an existing circuit-switched or packet-switched network as a first step in the transition to an all IP-based network. One example of a hybrid network combines an IS2000 radio access network to provide voice and low-rate packet data services, with an IS855 radio access network to provide high-rate packet data services. When the mobile station is monitoring the packet data channel in the IS-856 network, the IS2000 network may need to page the mobile station to connect an incoming voice call. Conventionally, the mobile station would be required to periodically transition to the IS2000 network to monitor the common channels while operating within the IS856 network.

The IS856 standard has been recently amended to include a protocol known as the circuit service notification protocol (CSNP). The CSNP enables the IS2000 network to send signaling messages to the mobile station via the IS856 network so that the mobile station no longer needs to periodically return to the IS2000 network to receive circuit services notifications. When the mobile station receives an A1 paging request from the IS856 access network, the mobile station switches to a IS2000 carrier and transmits a page response message. The MSC will typically include a TAG information element in the A1 paging request sent to the IS856 access network. The TAG information element is normally used in the IS2000 network to match a page response from the mobile station with the corresponding A1 paging request. However, the TAG information element is not transmitted to the mobile station and there is currently no way to transmit the TAG IE from the IS 856 access network to the IS2000 base station. Consequently, the IS2000 base station will process the page response as an unsolicited page response. When an A1 page response is forwarded to the MSC, the MSC will not be able to correlate the A1 paging response to the original A1 paging request and may reject or ignore the A1 page response.

One way to handle unsolicited paging response messages at the MSC would be to send the A1 paging request to the IS2000 base station as well as the IS856 access network even though the mobile station is known to be currently operating in the IS856 access network. This solution, however, wastes valuable air interface resources for redundant page messages that will not be received by the mobile station. Another possible solution would be to modify the MSC to handle unsolicited page responses without the need for a TAG IE to correlate the page response with a paging request. However, implementing changes in the MSC can be complicated and are not desirable.

SUMMARY OF THE INVENTION

The present invention provides a method of paging a mobile station in a hybrid network. A mobile switching center (MSC) may send a paging request message with a silent page indicator. The base station suppresses paging responsive to a silent paging request. This procedure may be used, for example, to page a mobile station in an IS2000 network when the mobile station is operating in an IS856 network or to page a mobile station in the IS856 network when the mobile station is operating in an IS2000 network. The silent paging request provides paging parameters to the base station without causing unnecessary paging of the mobile station over the air interface.

In an alternate embodiment of the invention, the base station examines the paging request to determine if the paging request includes a predetermined indication indicating that the mobile station is operating in the IS856 network. For example, the predetermined indication may comprise a IS856 service option within the paging request message. If the paging request includes the predetermined indication, the base station sends a page message to the mobile station and then sends an immediate paging response to the MSC without waiting for a page response from the mobile station.

DETAILED DESCRIPTION OF THE INVENTION

Figure 1:
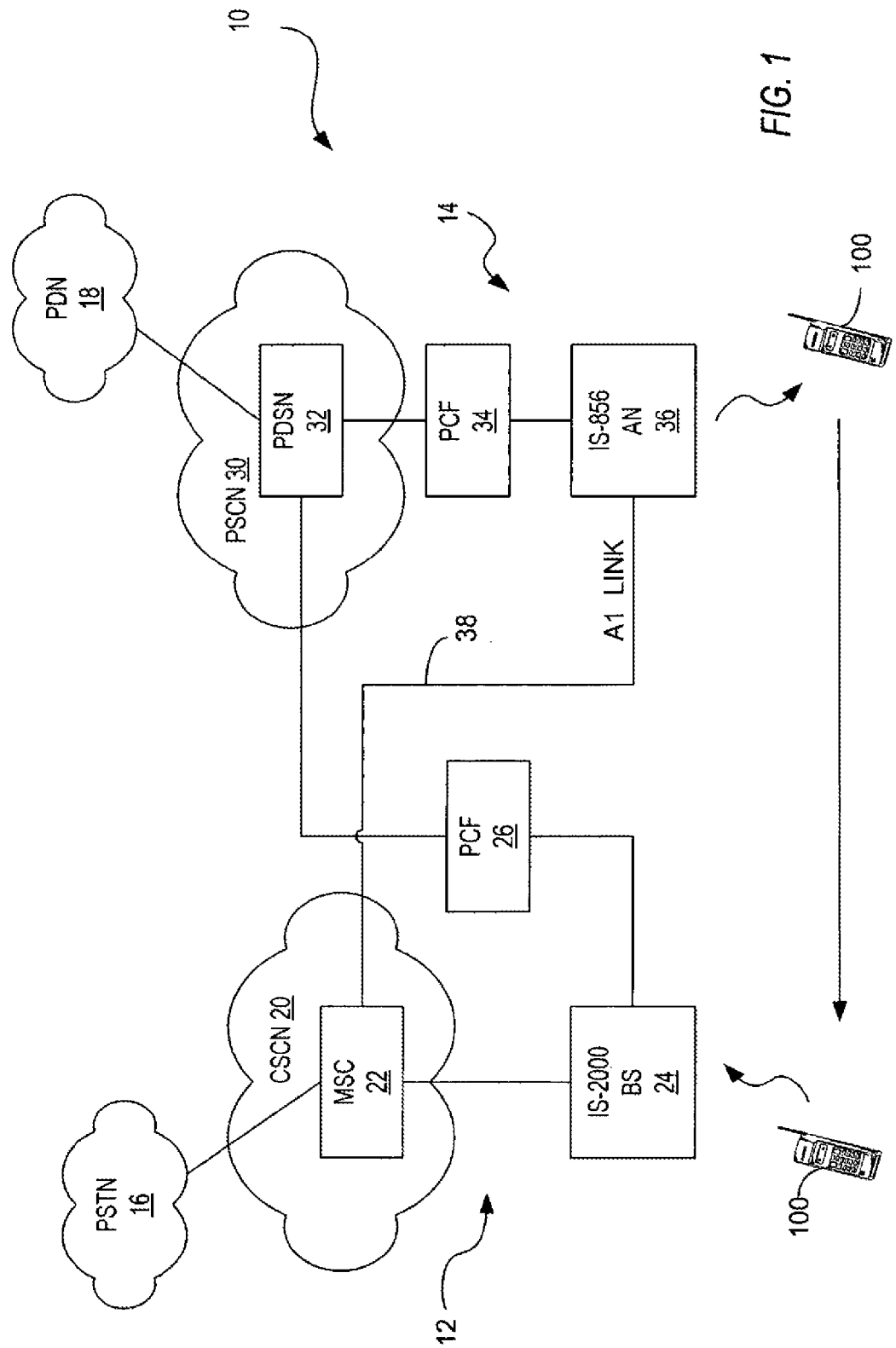
FIG. 1 is a diagram illustrating an exemplary hybrid network combining an IS2000 network and an IS856 network.

Referring now to the drawings, the present invention will be described in the context of a hybrid network 10 providing both voice and data services to mobile stations 100. In the exemplary embodiment shown herein, the hybrid network 10 comprises a composite network incorporating both an IS2000 radio access network (IS2000 RAN) 12 and an IS856-A radio access network (IS856 RAN) 14. The exemplary embodiment is intended to be illustrative only and those skilled in the art will appreciate that the present invention also applies to networks based on other network standards.

The IS2000 RAN 12 comprises one or more base stations 24 connected to a circuit-switched core network (CSCN) 20. The CSCN 20 primarily provides voice services and low rate data services, such as facsimile services, to the mobile stations 100. The CSCN 20 includes a mobile switching center (MSC) 22 that provides a connection to the public-switched telephone network (PSTN) 16. The MSC 22 routes packets between the PSTN 16 and the base stations 24. The base stations 24 communicate with the mobile stations 100 over the air interface. The base stations 24 forward downlink traffic and signaling from the MSC 22 to the mobile stations 100, and forward uplink traffic and signaling from the mobile stations 100 to the MSC 22.

The IS2000 RAN 12 may further include a packet core function (PCF) 26 that connects the IS2000 RAN 12 to a packet-switched core network (PSCN) 30. The PSCN 30 includes a PDSN 32 that connects to a packet data network 18, such as the Internet. The PSCN 30 enables the IS2000 base stations 24 to provide packet data services to mobile stations 100 over an IS2000 carrier. The PDSN 32 establishes communication sessions with mobile stations 100 using, for example, the point-to-point protocol (PPP). The IS2000 RAN 12 forwards mobile-terminated packet data from the PDSN 32 to the mobile stations 100, and forwards mobile-originated packet data from the mobile stations 100 to the PDSN 32.

The IS2000 standards have been recently revised to include forward and reverse packet data channels providing high-speed packet data services over a IS2000 carrier. The revised IS2000 standard is known as 1xEV-DV. Thus, the IS 2000 network may support high rate packet data services, as well as voice services where forward and/or reverse link packet data channels are supported.

A network operator may choose to employ a high data rate (HDR) network 14, such as an IS856 network, to provide high speed packet data services in some areas as shown in FIG. 1. The IS856 standard is generally known as 1xEN-DO. The IS856 RAN 14 comprises one or more access networks (ANs) 36 for communicating with the mobile stations 100 and a packet core function (PCF) 34 connecting the IS856 RAN 14 to the PSCN 30. The IS856 AN 36 and PCF 34 perform essentially the same functions as the IS2000 base station 24 and PCF 26. The IS856 RAN 14 provides high-speed packet data services to the mobile stations 100. The IS 856 RAN 14 may be employed, for example, in areas where the IS2000 RAN 12 does not support the forward and reverse packet data channels. A signaling link 38 connects the IS856 AN 36 with the MSC 22. As will be described in more detail below, signaling link 38 enables the mobile stations 100 to exchange signaling messages with the MSC 22 while operating within the IS856 RAN 14.

Figure 2:
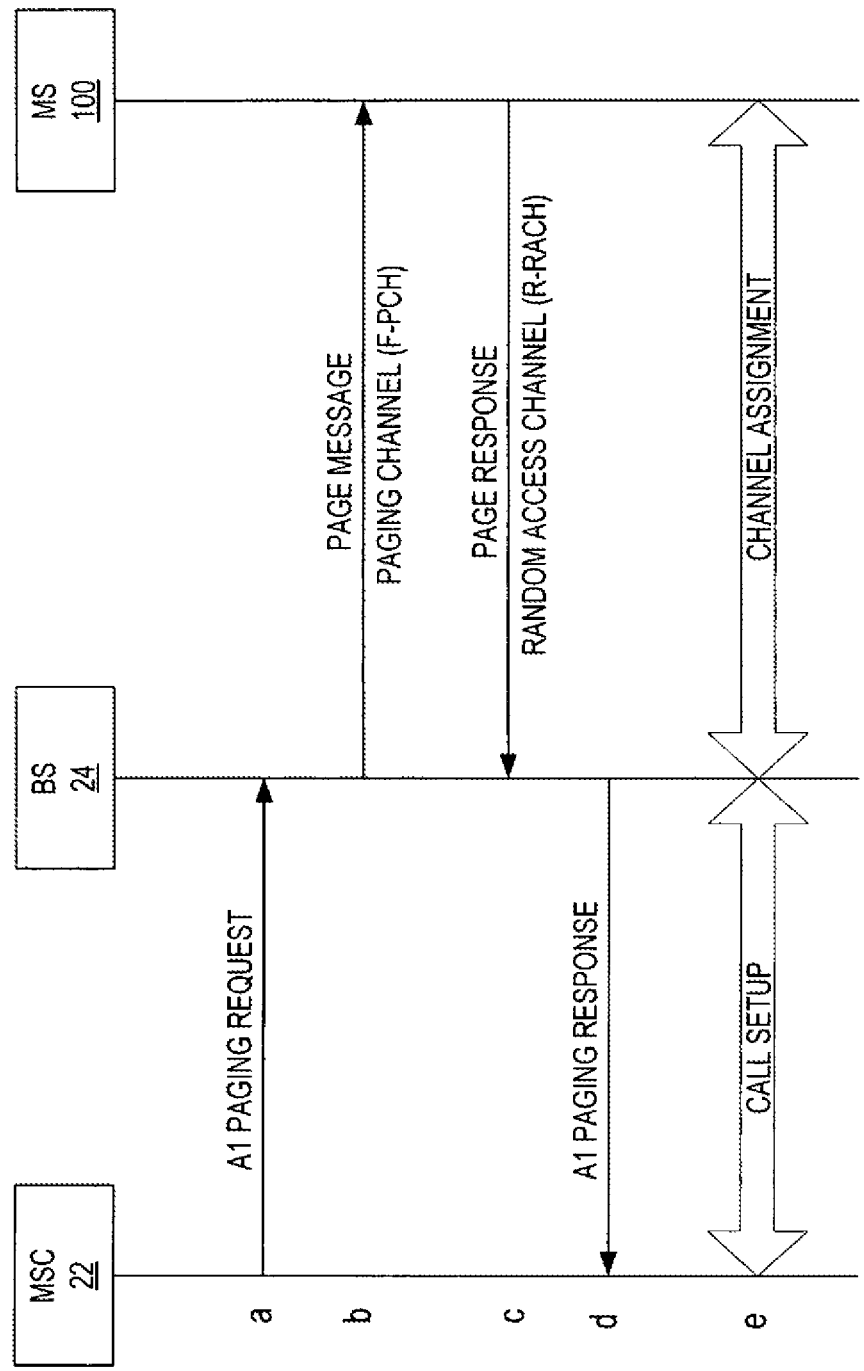
FIG. 2 is a call flow diagram illustrating a conventional paging procedure for paging a mobile station while the mobile station is operating within the IS2000 network.

There are several scenarios where the MSC 22 may need to page a mobile station 100. For example the MSC 22 may need to page the mobile station 100 when it receives an incoming voice call for the mobile station 100. An exemplary paging procedure for paging a mobile station 100 in the IS2000 RAN 12 is illustrated in FIG. 2. The MSC 22 sends an A1 paging request message to the base station 24 serving the mobile station 100 (step a), and the base station 24 sends a page message over a forward paging channel (F-PCH) to the mobile station 100 (step b). A mobile station 100 receiving a page message over the paging channel transmits a page response message to the base station 24 (step c), which sends and A1 paging response to the MSC 22 (step d). The page response message may be sent on a reverse Random Access Channel (R-RACH) or reverse Enhanced Random Access Channel (R-EACH). Call setup and channel assignment procedures are then performed to establish the call (step a).

An idle mobile station 100 registered with the IS2000 RAN 12 monitors the paging channel broadcast by the IS2000 base station 24 for incoming page messages. The mobile station 100 may also perform periodic searches for an IS856 carrier. If an IS856 carrier is found, the mobile station 100 may register with the IS856 RAN 14, in one common mobile station implementation, an idle mobile station 100 registered with both the IS2000 and IS856 RANs 12, 14 camps on a control channel in either the IS2000 or IS856 network and periodically scans the control channels in the other network to check for incoming messages and/or notifications, in some implementations, the mobile station 100 may preferentially camp on a control channel in the IS856 network. In this case, the mobile station 100 would periodically scan the control channels in the IS2000 network to receive page message and other circuit-switched notifications. Switching between carriers can be complex and there is a possibility that the mobile station 100 may miss some notifications. Also, if the mobile station 100 is monitoring a broadcast channel but still wants to receive voice call notifications, it has to tune to the IS2000 carrier, which results in disruption of the broadcast service. However, recent enhancements in the IS856 standards enable signaling between the MSC 22 and the IS856 RAN 14. In hybrid networks 10 where a signaling link 38 exists between the MSC 22 and IS856 RAN 14, a dual mode IS2000/IS856 mobile station 100 can send signaling messages to and receive signaling messages from the MSC 22 via the IS856 RAN 14. Thus, a dual mode mobile station 100 operating within the IS856 RAN 14 can communicate with the MSC 22 over the IS856 channels to receive incoming pages and to perform idle mode operations, such as periodic registration. As a result, there is no need for the mobile station 100 to monitor the paging channel in the IS2000 RAN 12 when operating within the IS856 RAN 14.

Figure 3:
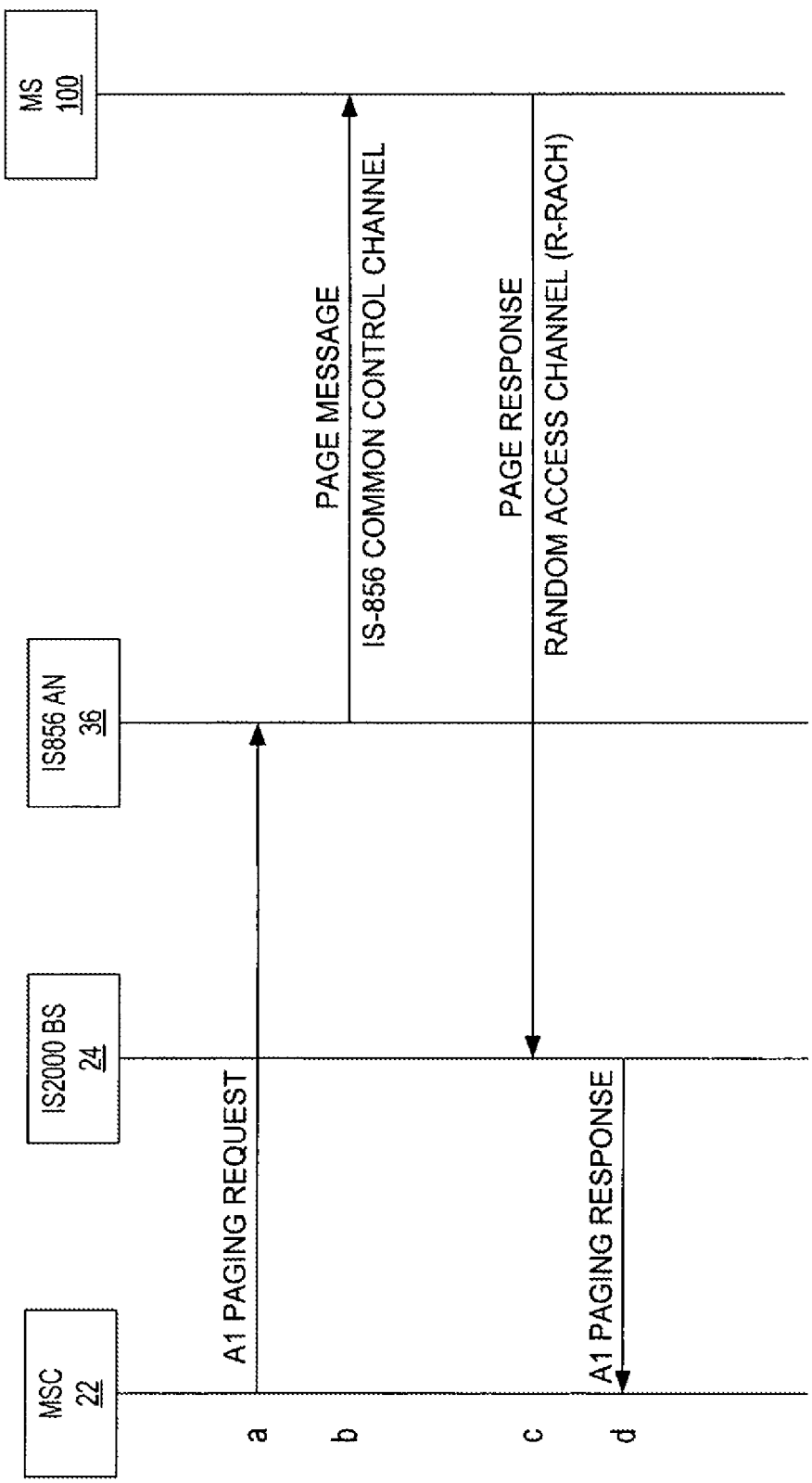
FIG. 3 is a call flow diagram illustrating a conventional paging procedure for paging a mobile station in the IS2000 network while the mobile station is operating within the IS856 network.

FIG. 3 illustrates a procedure for paging a mobile station 100 when the mobile station 100 is operating within en IS856 RAN 14. It is assumed that the mobile station 100 is registered with both the IS2000 RAN 12 and IS856 RAN 14. As part of a session establishment procedure in the IS856 RAN 14, the mobile station 100 registers for CSNA with the IS856 RAN 14, which in torn notifies the MSC 22 to forward service notifications for the mobile station 100 via the IS856 RAN 14. The mobile station 100 will then monitor the common channel in the IS856 RAN 14 in idle mode. When the MSC 22 receives an incoming voice call for the mobile station 100, the MSC 22, rather than sending the A1 paging request to the IS2000 BS 24, sends an A1 paging request message to the IS856 RAN 14 (step a). It is assumed that the MSC 22 does not send the A1 paging request to the IS2000 BS 24 because such would waste air interface resources. An AN 36 in the IS856 RAN 14 sends a page message to the mobile station 100 over the IS856 common control channel (step b). The page message notifies the mobile station 100 that it has an incoming voice call in the IS2000 RAN 12. The mobile station 100 tunes to the IS2000 carrier and transmits a page response message to an IS2000 base station 24 in the IS2000 RAN 12 (step c). The IS2000 base station 24 reformats the page response for transmission over the A1 interface and sends an A1 paging response to the MSC 22 (step d). The A1 paging request does not include the TAG IE and, consequently, the MSC 22 may reject or disregard the A1 paging request.

There are two potential problems with the paging procedure shown in FIG. 3. First, MSC 22 typically includes a mobile station identifier, e.g., IMSI, and a correlation value in the A1 paging request message for correlation purposes. In the IS2000 standards the correlation value is called the TAG information element (IE). The MSC 22 expects the A1 paging response message to contain the same correlation value as the A1 paging request message so that it can match the A1 paging response message to the correct A1 paging request message. If the correlation value does not match, the MSC 22 may discard the A1 paging response message. The page message sent by the IS856 RAN 14 does not include the TAG IE and there is currently no way to pass the TAG IE from the IS856 RAN 14 to the IS2000 BS 24. Consequently, the IS2000 BS 24 will process the page response as an unsolicited page response. When the A1 page response is sent to the MSC, the MSC will not be able to correlate the A1 page response with the original A1 paging request.

Secondly, some MSC implementations require that the A1 paging response message be returned on the same physical connection on which the A1 paging request message was sent. If the MSC 22 receives the A1 paging response message over a different physical connection, it may treat the A1 paging response message as unsolicited and ignore the A1 paging response message.

Figure 4:
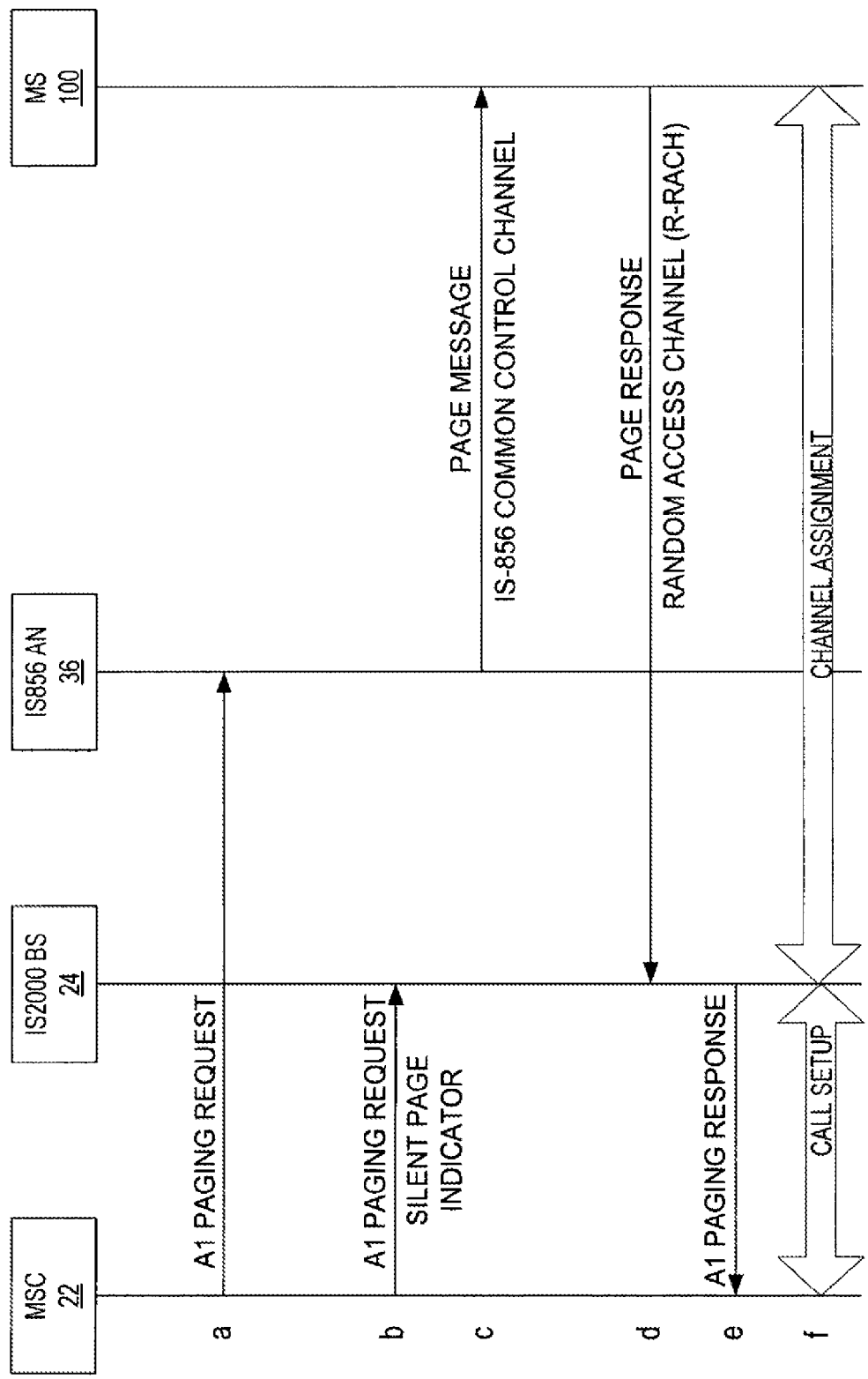
FIG. 4 is a call flow diagram illustrating a paging procedure according to one exemplary embodiment of the present invention for paging a mobile station in the IS2000 network while the mobile station is operating within the IS856 network.

FIG. 4 illustrates a paging procedure according to one embodiment of the present invention. As shown in FIG. 4, the MSC 22 sends an A1 paging request message to the IS856 RAN 14 as previously described (step a). The A1 paging request message includes the correlation value, e.g. TAG IE, and mobile station identifier, e.g. IMSI. According to the present invention, the MSC 22 also sends a page notification message to the IS2000 base station 24 when it pages a mobile station 100 in the IS856 RAN 14 (step b). In one exemplary embodiment, the page notification message comprises a conventional A1 paging request message with an additional indicator referred to therein as the "silent page" indicator. An A1 paging request message with a "silent page" indicator is referred to herein as a silent paging, request. The silent paging request message includes all of the information contained in the A1 paging request message sent to the IS856 RAN 14. In addition, the silent paging request message includes a "silent page" indicator instructing the IS2000 RAN 12 not to send a page message to the mobile station 100. When the "silent page" indicator is present, the base station 24 stores the mobile station identifier, e.g., IMSI, along with the correlation value contained in the A1 paging request message in a paged mobile list and suppresses paging. That is, the IS2000 base station 24 does not page the mobile station 100 when the "silent page" indicator is present in the A1 paging request message.

The IS856 RAN 14 sends a page message to the mobile station 100 responsive to the A1 paging request message (step c). Upon receipt of the page message, the mobile station 100 switches to the IS2000 RAN 12 and transmits a page response message to the IS2000 base station 24 over the random access channel or other reverse link channel (step d). When the page response message is received by base station 24, the base station 24 formats the page response message for transmission over the A1 interface, inserts the correlation value stored in memory, and forwards the A1 paging response to the MSC 22 (step d). The base station 24 determines the correct correlation value to include in the A1 paging response message by correlating the IMSI in the received page response from the mobile station 100 with the paged mobile list stored in memory.

Figure 5:
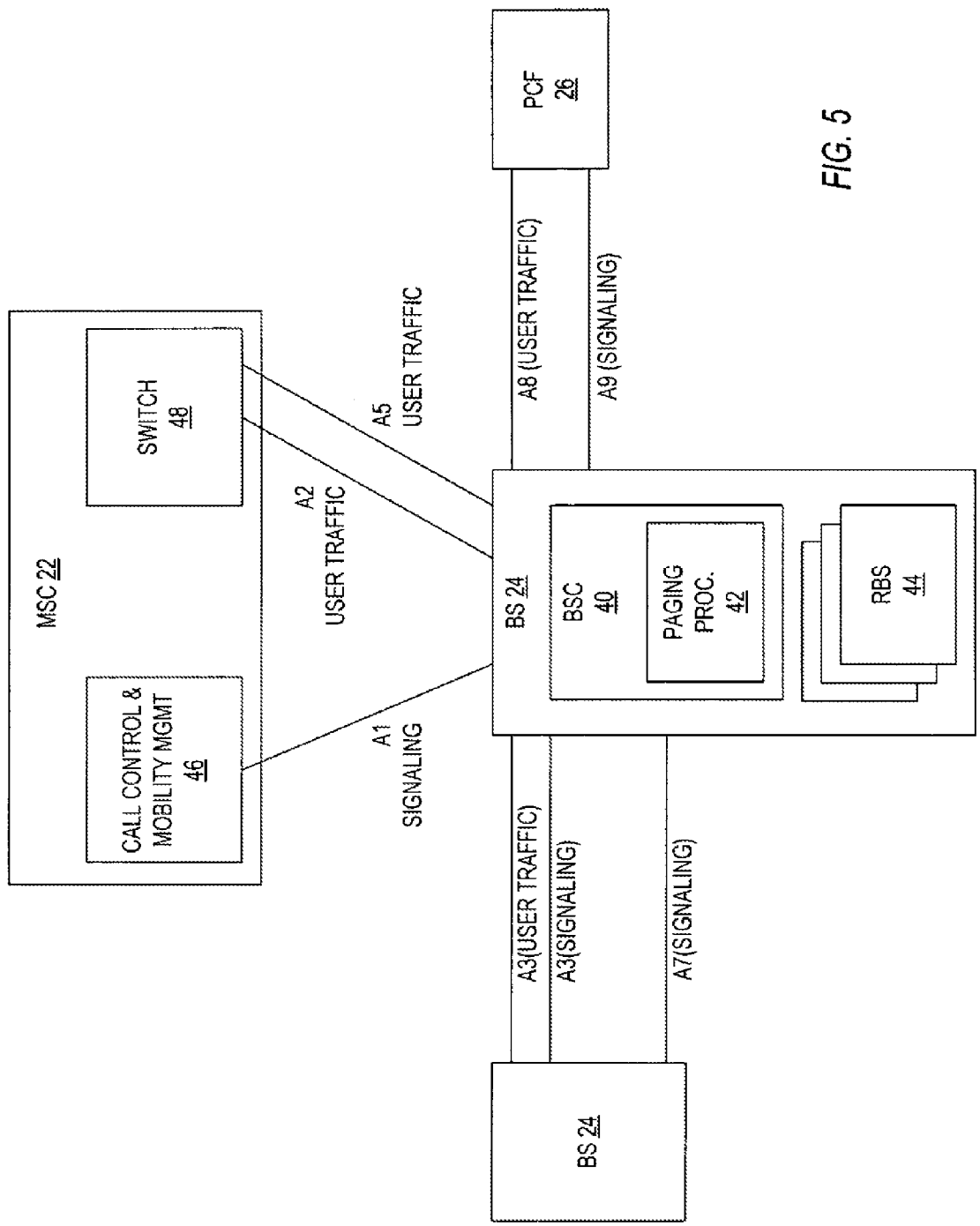
FIG. 5 is a block diagram illustrating an IS2000 base station according to one exemplary embodiment of the present invention.

FIG. 5 illustrates an exemplary MSC 22 and IS2000 base station 24 in more detail. The MSC 22 includes a call control and mobility management circuit 46 for call control handling and mobility management functions, and a switch 48 for routing user traffic. The base station 24 includes a base station controller 40 and one or more radio base stations (RBSs) 44. The RBSs 44 contain the radio equipment for communicating with the mobile stations 100. The BSC 40 comprises the control portion of the base station 24. The BSC 40 processes call control signaling and manages the radio and communication resources used by the RBSs 44. The BSC 40 includes a paging processor 42 to handle paging functions as described herein. Signaling traffic between the BSC 40 and the MSC 22 is carried over the A1 interface. User traffic between the MSC 22 and BS 24 is earned by the A2 and A5 interfaces. The A8 and A9 interfaces carry user traffic and signaling, respectively, between the base station 24 and PCF 26. The A3 and A7 interfaces interconnect IS2000 base stations 24. The A3 interface is used to transport user traffic and signaling for inter-BS handoff. The A3 interface is composed of two parts: signaling and user traffic. The A7 interlace carries signaling information between a source BS 24 and a target BS 24 for inter BS handoff.

Figure 6:
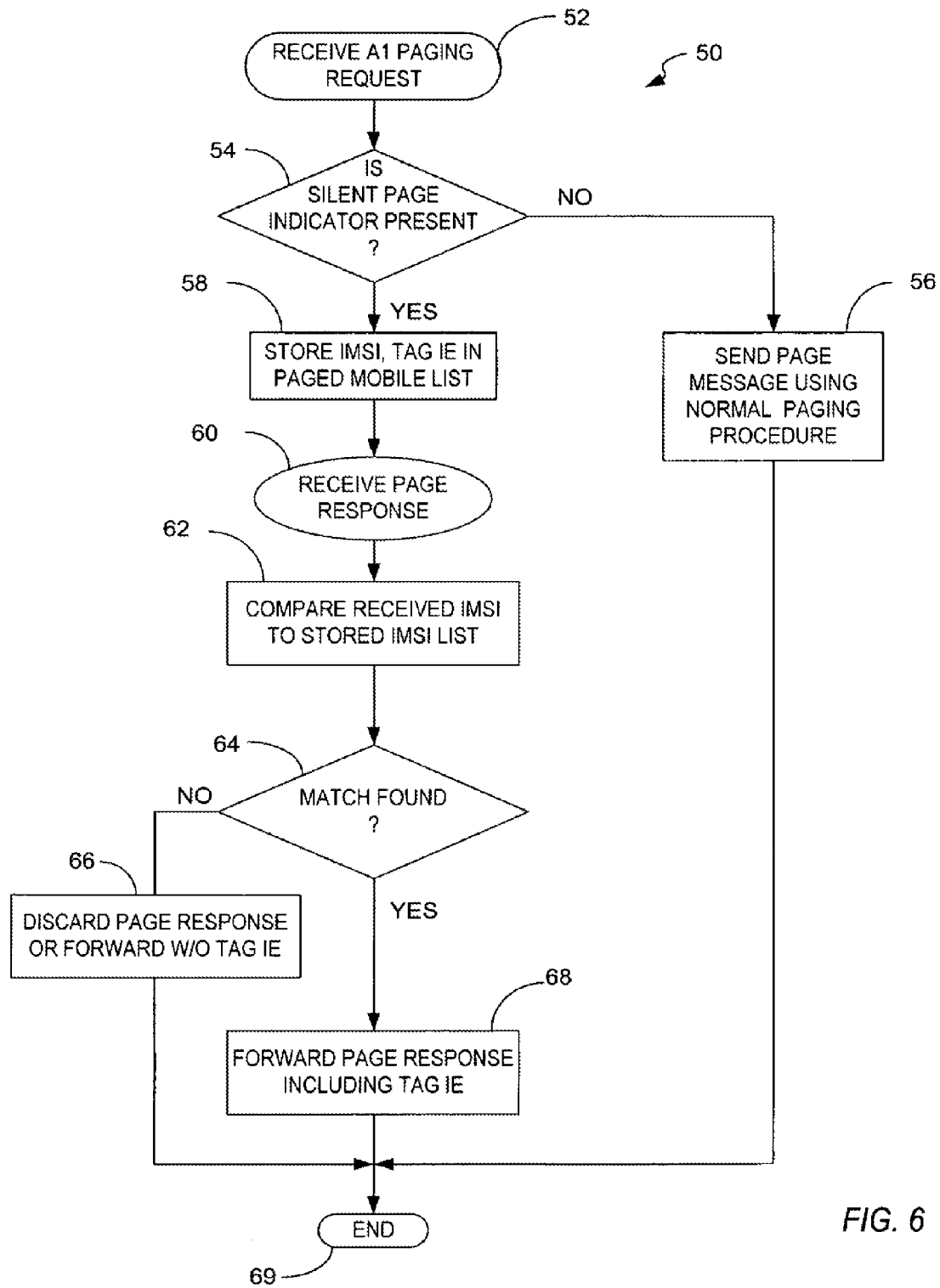
FIG. 6 is a flow chart illustrating a paging procedure for the IS2000 base station according to one exemplar embodiment of the present invention.

FIG. 6 is a flow diagram illustrating the operation of the IS2000 base station 24 according to one embodiment of the present invention. The paging procedure 50 begins when the base station 24 receives an A1 paging request message from the MSC 22 (block 52). The base station 24 determines whether the "silent page" indicator is present (block 54). If not, the base station 24 sends a page message to the mobile station 100 over the paging channel (block 56) using normal paging procedures. If the "silent page" indicator is present, the base station 24 reads the mobile station identifier, e.g. IMSI, and correlation value, e.g. TAG IE, from the A1 paging request message and stores the information in a paged mobile list (block 58). The base station 24 does not send a page message to the mobile station 100 over the paging channel, but does expect a paging response from the mobile station 100. The base station 24 may set a response timer. One purpose of the response timer is to free up memory associated with storing the IMSI/TAG IE information. The response timer is set based on factors such as slot cycle index, etc. Upon expiration of the response timer, the base station 24 may erase the associated IMSI/TAG IE information. The response timer is stopped if a paging response is received. When the base station 24 receives a page response message from the mobile station 100 (block 60), it compares the IMSI in the page response message to the paged mobile list stored in memory to find a corresponding correlation value to include the A1 paging response (block 62). If no matching IMSI is found (block 64), the base station 24 may either discard the page response message or send an A1 paging response to the MSC 22 without the correlation value IE (block 66). If a match is found (block 64), the base station formats the page response for transmission over the A1 interface, inserts the TAG IE, and forwards the A1 paging response with the TAG IE to the MSC 22 (block 68). The procedure ends (block 69) once the page response is processed.

Figure 7:
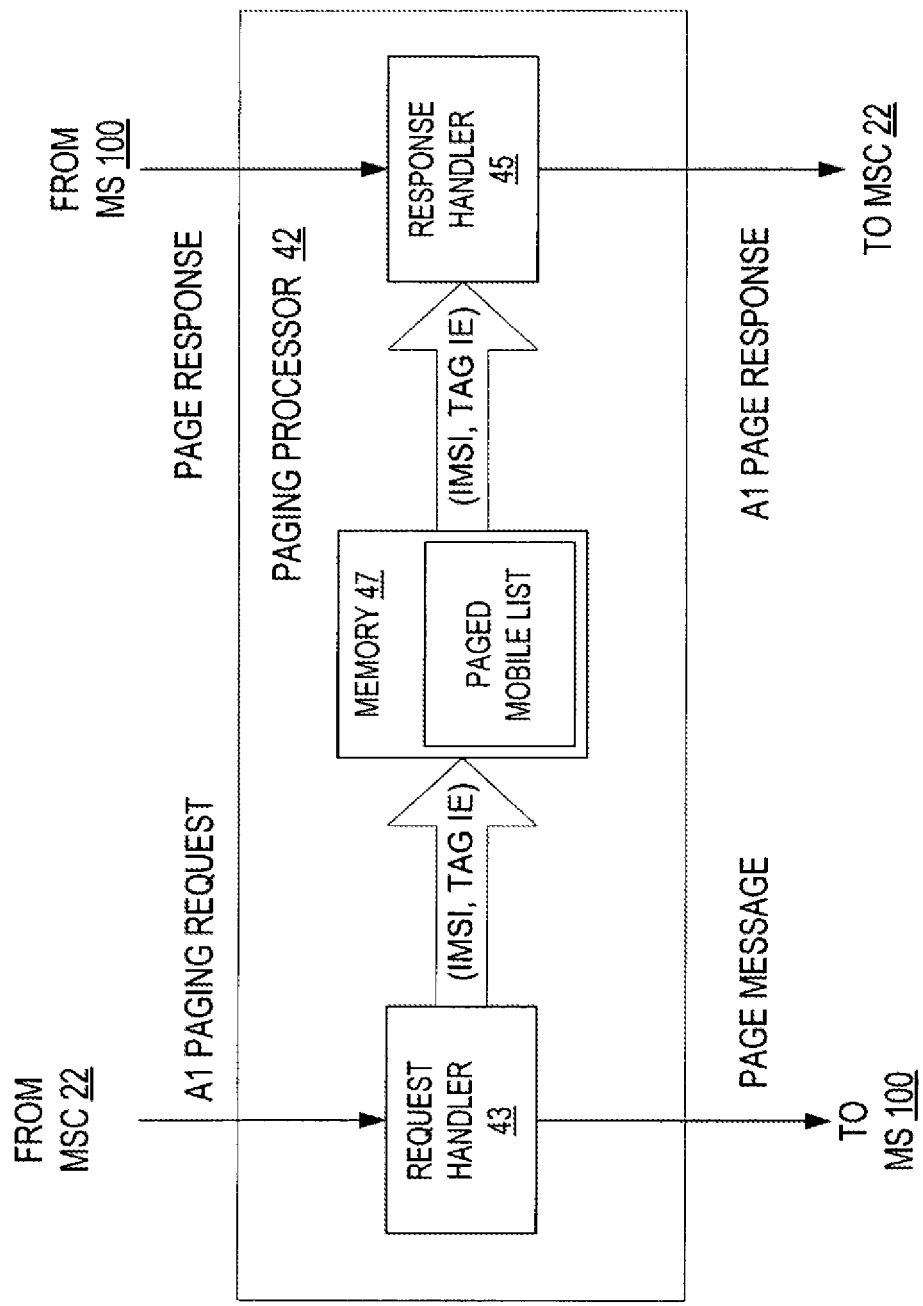
FIG. 7 is a block diagram illustrating a paging processor within the IS2000 base station according to one exemplary embodiment of the present invention.

FIG. 7 illustrates logical components of the paging processor 42. The paging processor 42 includes a request handler 43 and a response handler 45. The request handler 43 processes A1 paging requests from the MSC 22, while the response handler processes page responses from the mobile station 100. When an A1 paging request is received from the MSC 22, the request handler 43 determines whether to send a page message to the mobile station 100 by looking for a "silent page" indicator in the paging request. If the "silent page" indicator is present, the request handler 43 reads the mobile station identifier, e.g., IMSI, and correlation value, e.g., TAG IE, in the A1 paging request and stores this information in a paged mobile list in either internal or external memory 47. The response handler 45 receives page response messages from the mobile station 100. When an unsolicited page response message is received, the response handler 45 compares the IMSI contained in the received page response to the IMSIs in the paged mobile list in memory 47. If a match is found, the response handler 45 reformats the page response for transmission over the A1 interface, inserts the matching TAG IE, and forwards a A1 paging response message to the MSC 22.

Figure 8:
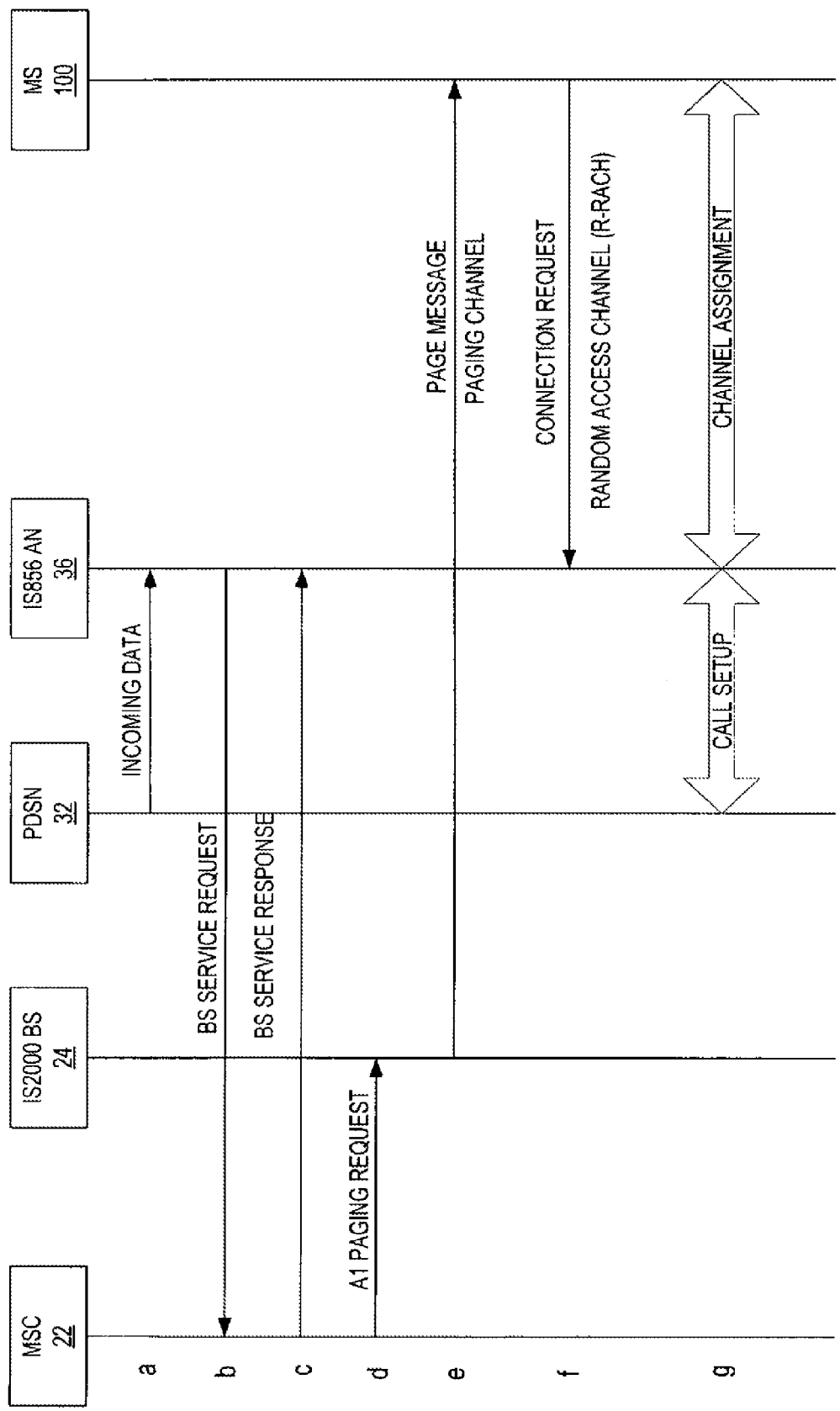
FIG. 8 is a call flow diagram illustrating a conventional paging procedure for paging a mobile station in an IS2000 network where the mobile station has a dormant packet data session in the IS856 network.

FIG. 8 illustrates another scenario where the paging method of the present invention may be used to avoid unnecessary paging. In the scenario shown in FIG. 8, the mobile station 100 has established a packet data session with the PDSN 32 and is operating within the IS856 RAN 14. In this scenario, the packet data session is dormant and an event has occurred which has caused the mobile station 100 to transition to the IS2000 RAN 12. Packet data for the mobile station 100 arrives at the PDSN 32. It is assumed that the IS2000 RAN 12 does not have a connection to the PDSN 32. Therefore, the PDSN 32 forwards the packet data to the IS856 RAN 14 (step a). The IS856 RAN 14 determines that the mobile station 100 is operating within the IS2000 RAN 12 and sends a BS service request to the MSC 22 to alert the mobile station 100 that the IS856 RAN 14 has incoming packet data for the mobile station 100 (step b). After sending a BS service response (step c), be the MSC 22 sends an A1 paging request to the IS2000 RAN 12 (step d), which in turn pages the mobile station 100 (step d), as previously described. The desired behavior is that the mobile station 100 will return to the IS856 RAN 14, and send a connection request (step f) to establish a connection to the IS856 RAN 14 to receive the incoming packet data. After receiving the connection request, the IS 856 RAN 14 assigns a channel to the mobile station 100 and sets up an A10 connection to the PDSN 32. (step g).

In this scenario, if the mobile station 100 transitions to the IS856 RAN 14 without responding to the page message, and consequently the IS2000 BS 24 does not send an A1 paging response to the MSC 22. The MSC 22 will set a timer after sending the A1 paging request to the IS2000 BS 24 and wait for an A1 paging response. If an A1 paging response is not received before the timer expires, the MSC 22 will infer that there is a problem and reattempt to page the mobile station 100. Depending on vendor implementation, the second and subsequent A1 paging request messages may be sent to all base stations 24. In any event, the subsequent page attempts will fail because the mobile station 100 is no longer operating within the IS2000 IRAN 12.

Figure 9:
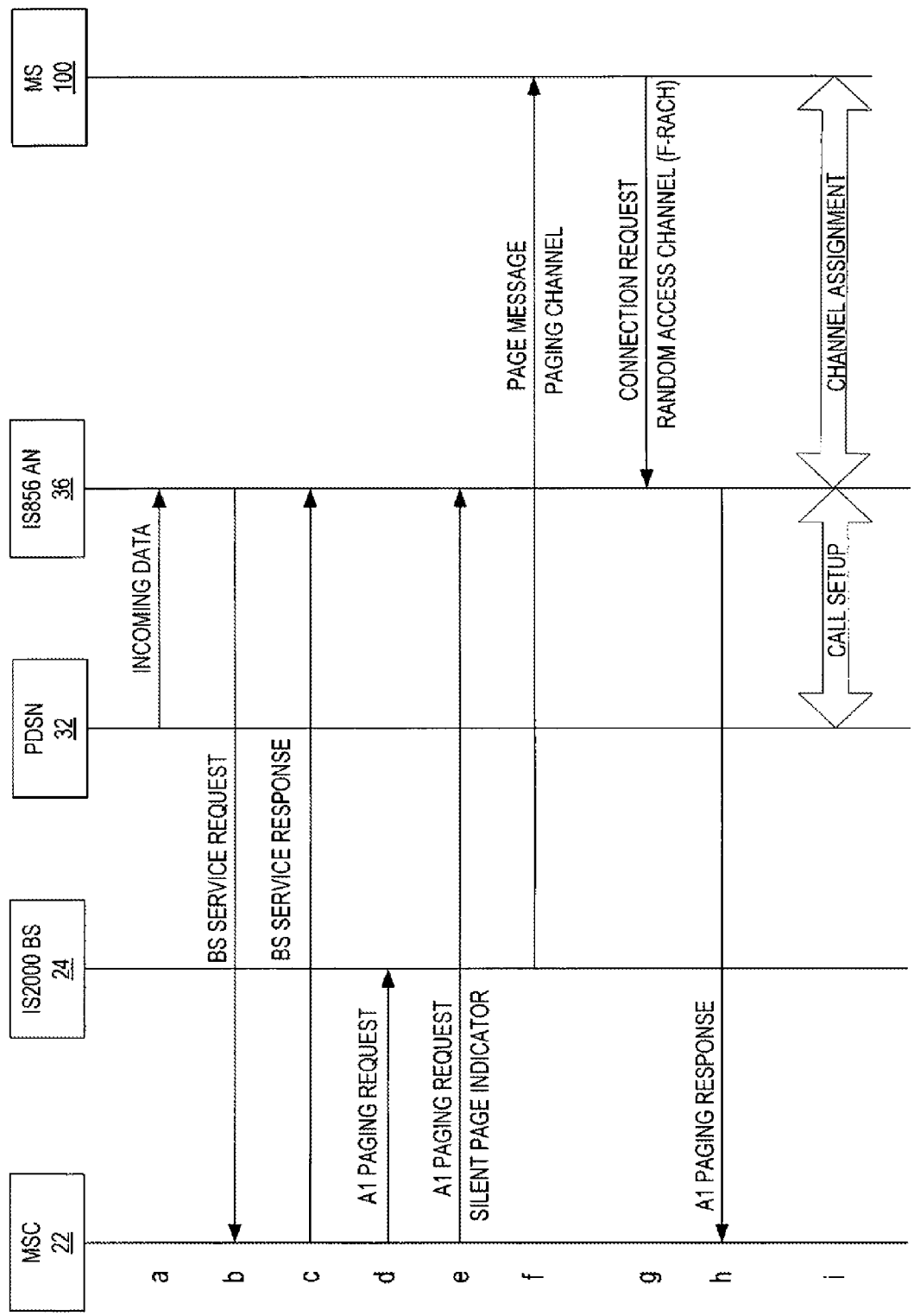
FIG. 9 is a call flow diagram illustrating a paging procedure according to one exemplary embodiment of the present invention for paging a mobile station in an IS2000 network where the mobile station has a dormant packet data session in the IS856 network.

FIG. 9 illustrates an exemplary paging procedure to avoid unnecessary paging when a mobile station 100 is no longer monitoring the IS2000 RAN 12. Packet data for the mobile station 100 arrives at the PDSN 32. It is assumed that the IS2000 RAN 12 does not have a connection to the PDSN 32. Therefore, the PDSN 32 forwards the packet data to the IS856 RAN 14 (step a). The IS856 RAN 14 determines that the mobile station 100 is operating within the IS2000 RAN 12 and sends a BS service request to the MSC 22 to alert the mobile station 100 that the IS856 RAN 14 has incoming packet data for the mobile station 100 (step b). After sending a BS service response (step c), the MSC 22 according to the present invention may, in addition to sending the initial A1 paging request message to the IS2000 RAN 12 (step d), also send the A1 paging request message to the IS856 RAN 14 with a "silent page" indicator (step e). The silent page request instructs the IS856 RAN 14 to expect a page response from the mobile station 100, but the "silent page" indicator tells the access network 34 not to transmit a page message. The IS2000 RAN 12 sends a page message to the mobile station 100 (step f). The IS856 RAN 14, upon receipt of the silent page request, stores the IMSI and TAG IE and then waits for a connection request from the mobile station 100. When the IS856 RAN 14 receives a connection request from the mobile station 100 (step g), it will send an A1 paging response message to the MSC 22 (step h). The MSC 22 will realize that the mobile station 100 is monitoring the IS856 RAN 14 and terminate the paging process. After receiving the connection request, the IS 856 RAN 14 assigns a channel to the mobile station 100 and sets up an A10 connection to the PDSN 32. (step i).

Figure 10:
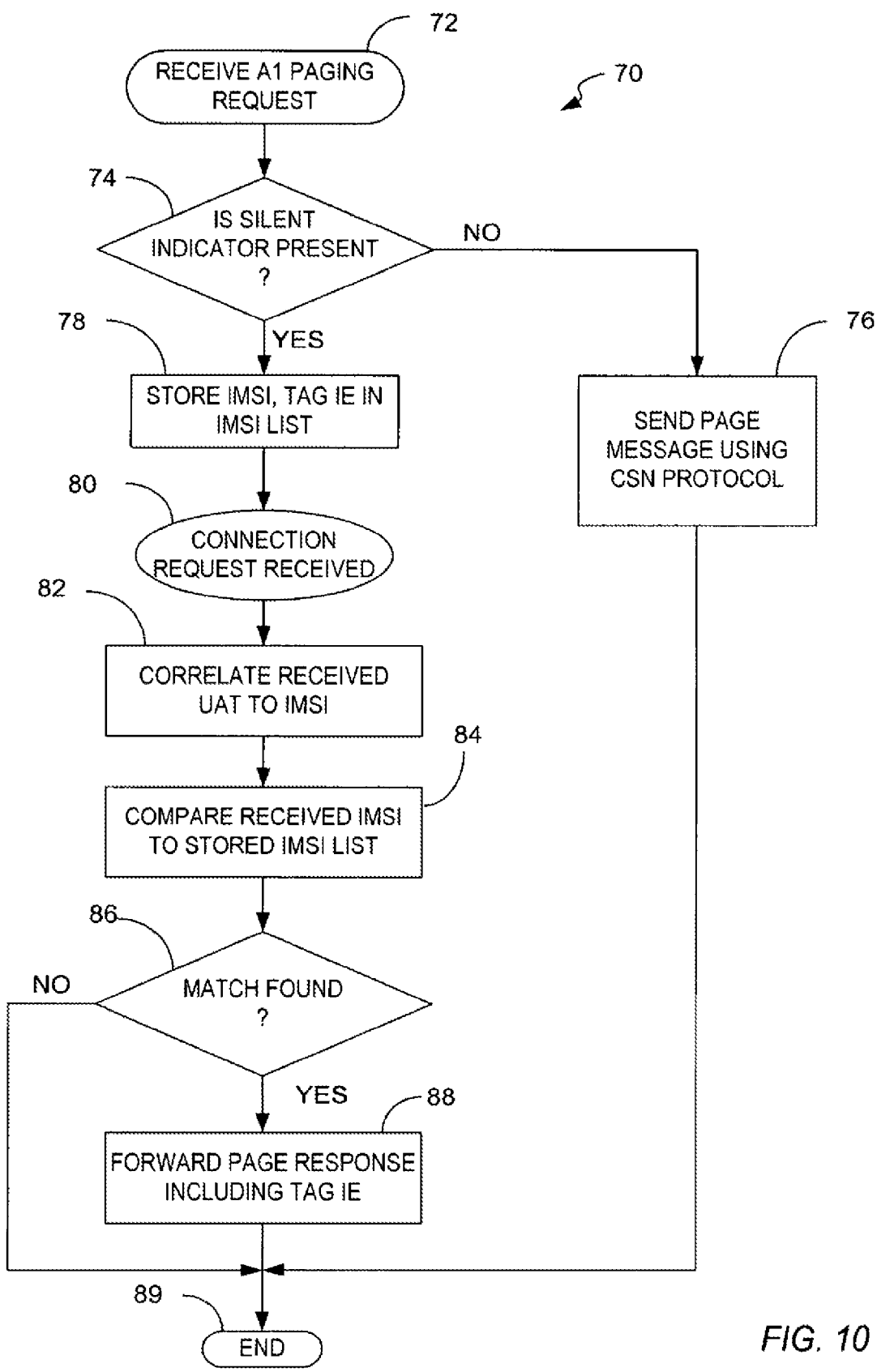
FIG. 10 is a flow chart illustrating a paging procedure for the IS856 base station according to one exemplary embodiment of the present invention.

FIG. 10 illustrates an exemplary procedure 70 implemented by the IS856 RAN 14 to avoid unnecessary paging. The procedure 70 begins when the IS856 RAN 14 receives an A1 paging request message from the MSC 22 (block 72). The IS856 RAN 14 examines the A1 paging request message to determine if the "silent page" indicator is present (block 74). If not, the IS856 RAN 14 transmits a page message to the mobile station 100 using the CSN protocol (block 76) and the procedure ends (block 89). If the "silent page" indicator is present, the IS856 RAN 14 stores the IMSI and correlation value IE in an IMSI list (block 78). The IS856 RAN 14 does not send a page message, but waits for the mobile station 100 to reappear in the IS856 RAN 14. When the IS856 RAN 14 receives a connection request message (block 80) or other message indicating that the mobile station 100 is present, the IS856 RAN 14 extracts the UAT from the signaling message and correlates the UAT with an IMSI (block 82). The IS856 RAN 14 then compares the IMSI corresponding to the UAT in the received message to the paged mobile list (block 84). If no match is found (block 86), the procedure ends (block 89) and the received message is processed according to the IS878 protocols. If a match is found (block 86), the IS856 RAN 14 sends an A1 paging response message to the MSC 22 including the stored correlation value (block 88) and the procedure ends (block 89).

Figure 11:
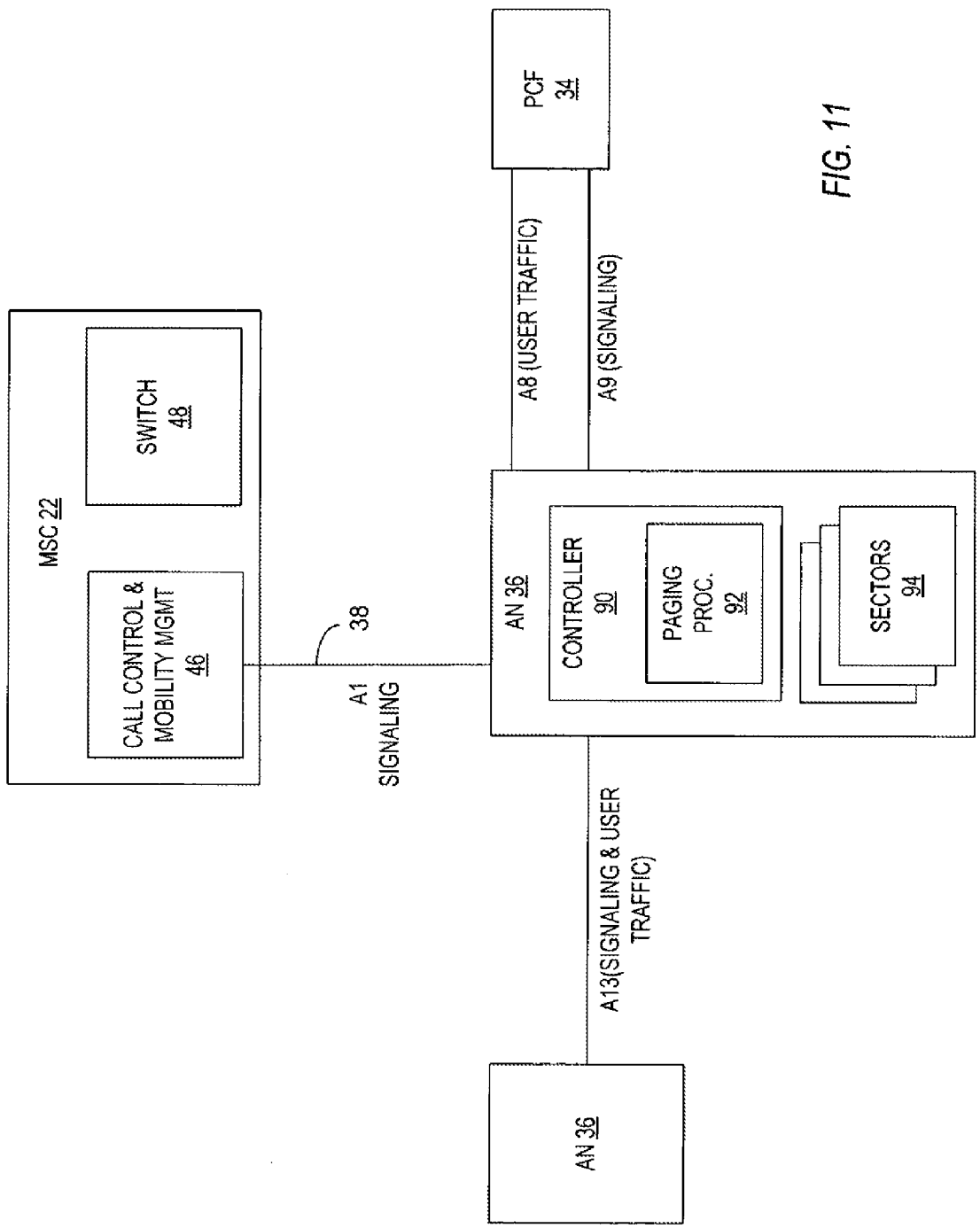
FIG. 11 is a block diagram illustrating an IS856 base station according to one exemplary embodiment of the present invention.

FIG. 11 illustrates an exemplary IS856 AN 38 according to one exemplary embodiment of the present invention. The IS856 AN 36 includes a controller 90 and one or more sectors 94. The sectors 94 contain the radio equipment for communicating with the mobile stations 100. The controller 90 comprises the control portion of the AN 36. The controller 90 processes call control signaling and manages the radio and communication resources used by the sectors 94. The controller 90 includes a paging processor 92 to handle paging functions as shown in FIG. 7. A signaling link 38 connects the AN 36 with the call control and mobility management circuits 46 in the MSC 22. Unlike the IS2000 base station 24, the IS856 AN 36 does not have a link with the MSC 22 for user traffic. The A8 and A9 interfaces carry user traffic and signaling, respectively, between the IS856AN 36 and PCF 34. The A13 interface transfers user traffic and signaling between IS856 ANs 36.

Figure 12:
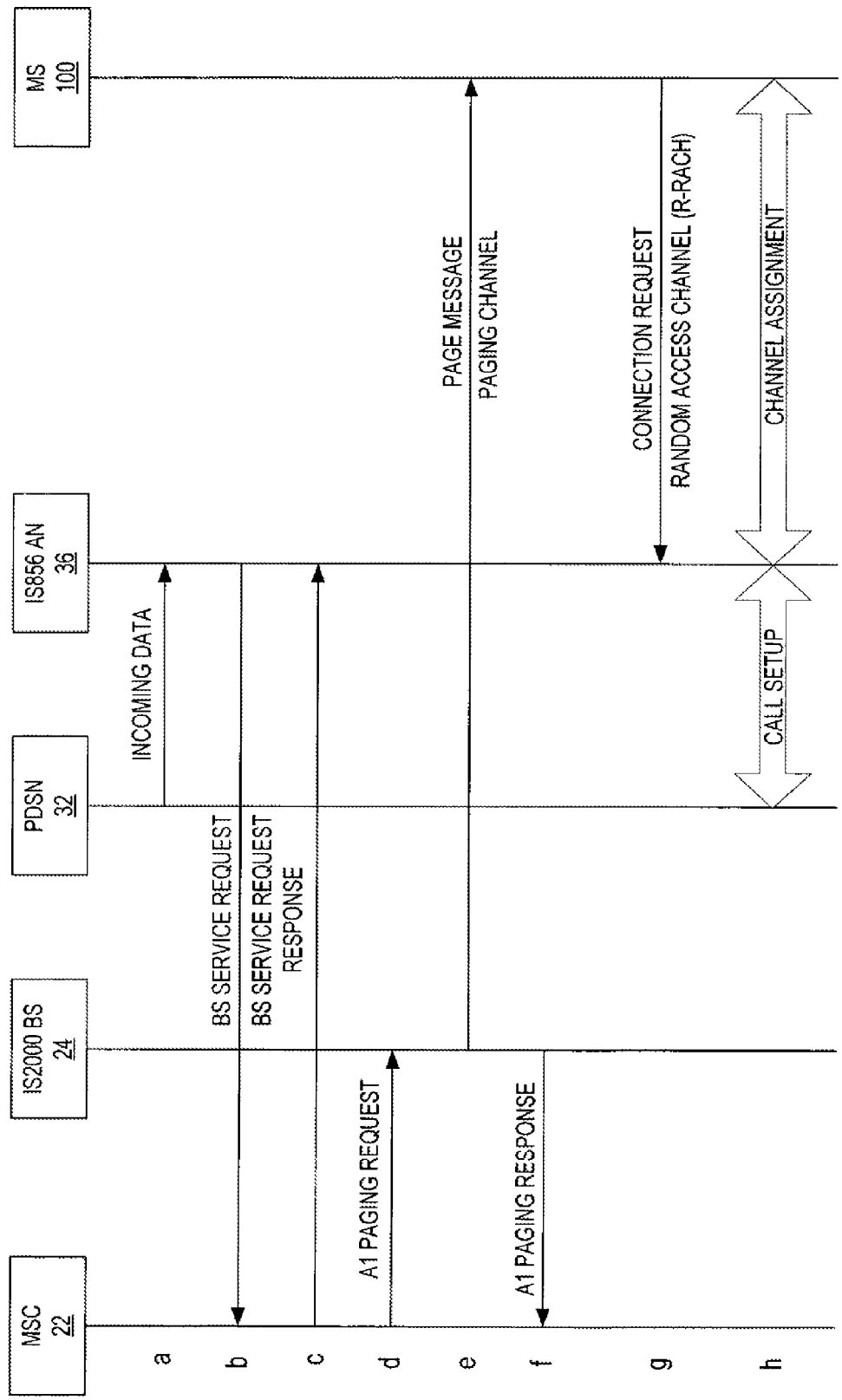
FIG. 12 is a call flow diagram illustrating a paging procedure a paging procedure according to another exemplary embodiment of the present invention for paging a mobile station in an IS2000 network where the mobile station has a dormant packet data session in the IS856 network.

FIG. 12 illustrates a procedure according to another embodiment of the present invention for paging a mobile station in an IS2000 network when the mobile station has a dormant packet data session in the IS856 network. Packet data for the mobile station 100 arrives at the PDSN 32. It is assumed that the IS2000 RAN 12 does not have a connection to the PDSN 32. Therefore, the PDSN 32 forwards the packet data to the IS856 RAN 14 (step a). The IS856 RAN 14 determines that the mobile station 100 is operating within the IS2000 RAN 12 and sends a BS service request to the MSC 22 to alert the mobile station 100 that the IS856 RAN 14 has incoming packet data for the mobile station 100 (step b). After sending a BS service response (step c), the MSC 22 sends an A1 paging request message to the IS2000 RAN 12 (step d). In this embodiment, the IS2000 BS 24 includes logic to recognize that the A1 paging request contains an IS856 service option (i.e. SO 59H). When the IS2000 BS 24 detects a IS856 service option in the A1 paging request, it sends a page message to the mobile station 100 (step e) and then sends an immediate A1 paging response to the MSC 22 without waiting for an over-the-air response from the mobile station 100 (step f). The MSC 22 will realize that the mobile station 100 is monitoring the IS856 RAN 14 and terminate the paging process. When the IS856 RAN 14 receives a connection request from the mobile station 100 (step g), the IS 856 RAN 14 sets up an A10 connection to the PDSN 32 and assigns a channel to the mobile station 100 (step h), in this embodiment, there is no need to send an A1 paging request to the IS856 BS 24, and no need for the IS856 AN 36 to send an A1 paging response to the MSC 22.

Figure 13:
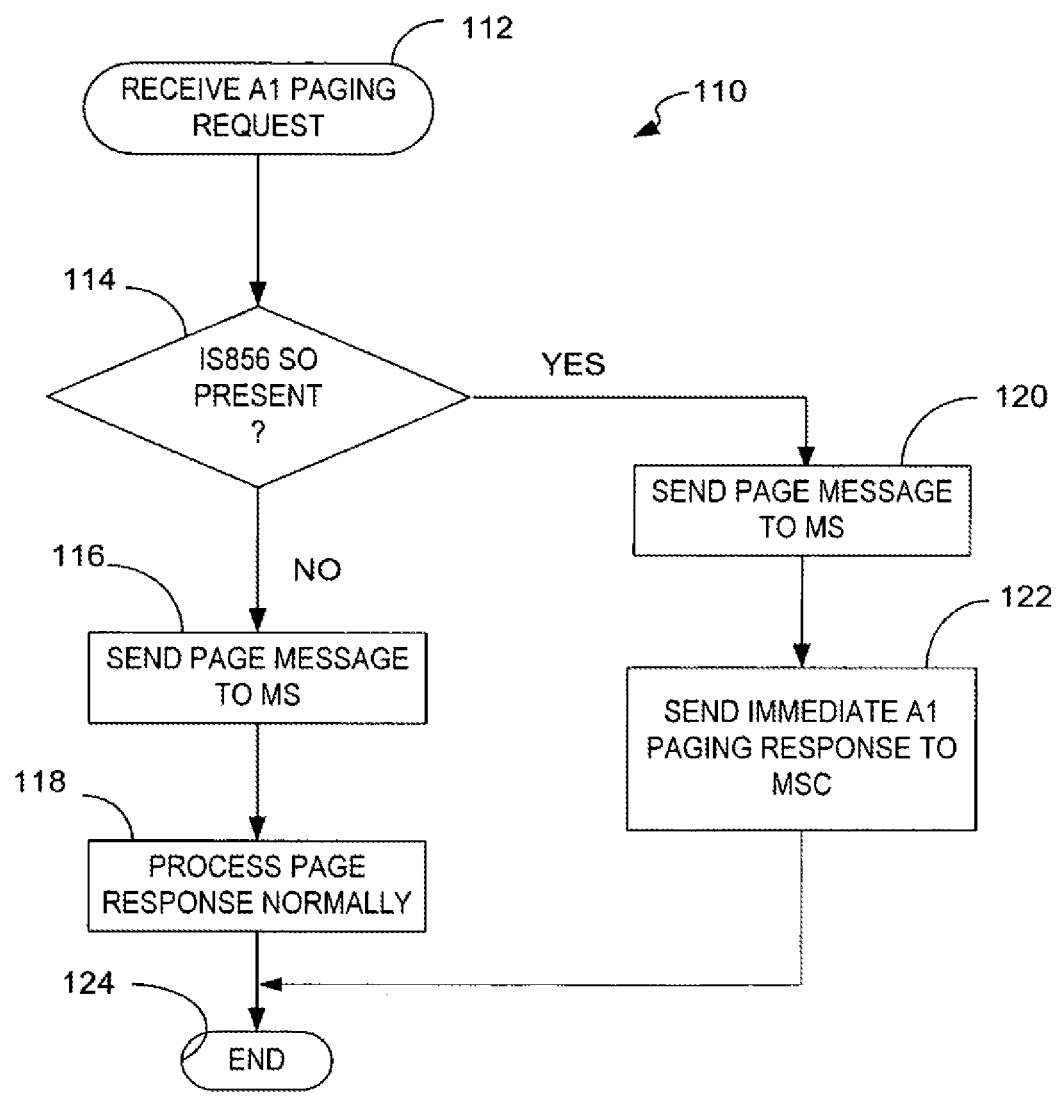
FIG. 13 is a flow chart illustrating a paging procedure for the IS2000 base station according to one exemplary embodiment of the present invention.

FIG. 13 illustrates an exemplary procedure 110 implemented by the IS2000 PAN 14 to avoid unnecessary paging when the mobile station 100 has a dormant packet data session with the IS8656 RAN 14 and receives data from the PDSN 32. When the IS2000 BS 24 receives an A1 paging request from the MSC 22, it examines the contents of the A1 paging request to determine if it contains an IS856 service option (step 112). If not, the IS2000 BS 24 sends a page message to the mobile station 100 (step 116) and processes the page response as usual (step 118) and the procedure ends (step 124). If the A1 paging request includes an IS856 service option, the IS2000 BS sends a page message to the mobile station 100 (step 120) then sends an immediate A1 paging response to the MSC 22 (step 122) without waiting for a page response. The immediate A1 paging request terminates the paging process at the MSC 22 (step 124.

Those skilled in the art will likely find other ways in which the paging method of the present invention may be utilized to benefit. In the exemplary embodiments described herein, the paging request message includes a "silent page" indicator that is used to suppress paging mobile stations to address spelling difficulties in a hybrid network without unnecessary paging of mobile stations. Rather than send a paging request message with a "silent page" indicator, the present invention could utilize another form of sending messages that notifies a base station 24 or access network 34 to notify the base station 24 or access network 34 to expect a page response or other message from the mobile station 100. It may be more descriptive to refer to the paging request with a "silent page" indicator simply as a page notification message. While a page notification message may take the form of a paging request with a "silent page" indicator, the present invention can be implemented with other message types and formats.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of paging a mobile station implemented by a base station, the method comprising:
   receiving, from a mobile switching center, a paging request message that includes a mobile station identifier of the mobile station that is being paged and a correlation value;
   in response to determining that the paging request message includes a silent page indicator, suppressing paging the mobile station and waiting for a page response from the mobile station;
   receiving a page response message at the base station from the mobile station;
   inserting the correlation value in the received page response message; and
   forwarding the page response message with the inserted correlation value to the mobile switching center.

2. The method of claim 1, wherein the correlation value is used for correlating the page response message coming from the mobile station to the paging request message received from the mobile switching center.

3. The method of claim 2, further comprising storing the mobile station identifier and the correlation value in a paged mobile list, upon receiving the paging request message from the mobile switching center.

4. The method of claim 3, further comprising, in response to receiving the page response message from the mobile station, determining a correlation value corresponding to the mobile station identifier of the mobile station from the paged mobile list, the received page response message including the mobile station identifier of the mobile station.

5. A base station for paging a mobile station, the base station comprising a processing circuitry that is configured to:
- receive, from a mobile switching center, a paging request message that includes a mobile station identifier of the mobile station that is being paged and a correlation value;
- in response to determining that the paging request message includes a silent page indicator,
- suppress paging the mobile station and wait for a page response from the mobile station;
- receive a page response message at the base station from the mobile station;
- insert the correlation value in the received page response message; and
- forward the page response message with the inserted correlation value to the mobile switching center.

6. The base station of claim 5, wherein the processing circuitry further comprises a paging processor and a memory containing instructions that, when executed, cause the paging processor to:
- receive, from the mobile switching center, a paging request message that includes a mobile station identifier of the mobile station that is being paged and a correlation value;
- in response to determining that the paging request message includes a silent page indicator,
- suppress paging the mobile station and wait for a page response from the mobile station;
- receive a page response message at the base station from the mobile station;
- insert the correlation value in the received page response message; and
- forward the page response message with the inserted correlation value to the mobile switching center.

7. The base station of claim 6, wherein the correlation value is used for correlating a page response message coming from the mobile station to the paging request message received from the mobile switching center.

8. The base station of claim 7, wherein the paging processor further stores the mobile station identifier and the correlation value in a paged mobile list, upon receiving the paging request message from the mobile switching center.

9. The base station of claim 8, wherein the paging processor, in response to receiving the page response message from the mobile station, further determines a correlation value corresponding to the mobile station identifier of the mobile station, the received page response message including the mobile station identifier of the mobile station.

10. A method of paging a mobile station comprising:
- receiving a paging request message at a base station from a mobile switching center,
- in response to determining that the paging request message includes a predetermined indication,
- sending a page message to the mobile station; and
- sending a paging response to the mobile switching center without waiting to receive a page response from the mobile station.

11. The method of claim 10, wherein the predetermined indication is an IS856 service option.

12. A base station for paging a mobile station, the base station comprising a processing circuitry that is configured to:
- receive a paging request message at the base station from a mobile switching center;
- in response to determining that the paging request message includes a predetermined indication, send a page message to the mobile station; and
- send a paging response to the mobile switching center without waiting to receive a page response from the mobile station.

13. The base station of claim 12, wherein the predetermined indication is an IS856 service option.

* * * * *

UNITED STATES PATENT AND TRADEMARK OFFICE
CERTIFICATE OF CORRECTION

PATENT NO. : 9,609,624 B2  
APPLICATION NO. : 14/868960  
DATED : March 28, 2017  
INVENTOR(S) : Julka et al.

Page 1 of 3

It is certified that error appears in the above-identified patent and that said Letters Patent is hereby corrected as shown below:

On the Title Page

In Item (57), under "ABSTRACT", in Column 2, Line 4, delete "seat" and insert -- sent --, therefor.

In Item (57), under "ABSTRACT", in Column 2, Line 5, delete "is a" and insert -- via a --, therefor.

In Item (57), under "ABSTRACT", in Column 2, Line 10, delete "as" and insert -- a --, therefor.

On Page 2, in Item (56), under "OTHER PUBLICATIONS", in Column 2, Line 1, delete "(ISO)" and insert -- (IOS) --, therefor.

In the Drawings

In Fig. 9, Sheet 9 of 13, delete "(F-RACH)" and insert -- (R-RACH) --, therefor.

In the Specification

In Column 1, Line 7, delete "2005," and insert -- 2005, now Pat. No. 9,198,156, --, therefor.

In Column 1, Lines 11-13, delete "This application claims priority to Provisional U.S. Patent Application 60/603,694 filed Aug. 23, 2004, which is incorporated herein by reference.".

In Column 1, Line 40, delete "IS855" and insert -- IS856 --, therefor.

In Column 2, Line 63, delete "exemplar" and insert -- exemplary --, therefor.

In Column 3, Lines 16-17, delete "a paging procedure a paging procedure" and insert -- a paging procedure --, therefor.

In Column 3, Line 35, delete "IS856-A" and insert -- IS856 --, therefor.

Signed and Sealed this  
Twentieth Day of August, 2019

Andrei Iancu  
*Director of the United States Patent and Trademark Office*

CERTIFICATE OF CORRECTION (continued)
U.S. Pat. No. 9,609,624 B2

In Column 4, Lines 9-10, delete "1xEN-DO." and insert -- 1xEV-DO. --, therefor.

In Column 4, Line 10, delete "IS856RAN" and insert -- IS856 RAN --, therefor.

In Column 4, Line 25, delete "example" and insert -- example, --, therefor.

In Column 4, Line 36, delete "and A1" and insert -- an A1 --, therefor.

In Column 4, Line 39, delete "Enhanced Random" and insert -- Enhanced --, therefor.

In Column 4, Line 41, delete "(step a)." and insert -- (step e). --, therefor.

In Column 4, Line 53, delete "notifications, in" and insert -- notifications. In --, therefor.

In Column 5, Line 11, delete "en" and insert -- an --, therefor.

In Column 5, Line 15, delete "CSNA" and insert -- CSNP --, therefor.

In Column 5, Line 16, delete "torn" and insert -- turn --, therefor.

In Column 6, Line 10, delete "paging," and insert -- paging --, therefor.

In Column 6, Line 51, delete "earned" and insert -- carried --, therefor.

In Column 6, Line 58, delete "interlace" and insert -- interface --, therefor.

In Column 8, Line 9, delete "32." and insert -- 32 --, therefor.

In Column 8, Line 22, delete "IRAN" and insert -- RAN --, therefor.

In Column 8, Line 53, delete "32." and insert -- 32 --, therefor.

In Column 9, Line 8, delete "IS878" and insert -- IS856 --, therefor.

In Column 9, Line 11, delete "value" and insert -- value IE --, therefor.

In Column 9, Line 13, delete "IS856 AN 38" and insert -- IS856 AN 36 --, therefor.

In Column 9, Line 56, delete "(step h), in" and insert -- (step h). In --, therefor.

In Column 9, Line 58, delete "IS856 BS 24," and insert -- IS2000 BS 24, --, therefor.

In Column 9, Line 61, delete "IS2000 PAN 14" and insert -- IS2000 RAN 12 --, therefor.

In Column 9, Line 63, delete "IS8656" and insert -- IS856 --, therefor.

CERTIFICATE OF CORRECTION (continued)
U.S. Pat. No. 9,609,624 B2

In Column 10, Line 8, delete "(step 124." and insert -- (step 124). --, therefor.

In the Claims

In Column 12, Line 15, in Claim 10, delete "center," and insert -- center; --, therefor.

In Column 12, Line 18, in Claim 10, delete "sending a page message to the mobile station; and" and insert the same at Line 17, after "indication," as a continuation subpoint.